US010205801B2

(12) United States Patent
Bright et al.

(10) Patent No.: US 10,205,801 B2
(45) Date of Patent: Feb. 12, 2019

(54) DATA TRANSFER POLICIES BETWEEN SOURCE AND TARGET SERVERS IN A WIDE AREA NETWORK

(71) Applicant: International Business Machines Corporation, Armonk, NY (US)

(72) Inventors: Jesse W. Bright, Tucson, AZ (US); Robert G. LaBrie, Tucson, AZ (US); Wayne W. Sun, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 319 days.

(21) Appl. No.: 14/994,069

(22) Filed: Jan. 12, 2016

(65) Prior Publication Data
US 2017/0201601 A1 Jul. 13, 2017

(51) Int. Cl.
*G06F 17/30* (2006.01)
*H04L 29/06* (2006.01)

(52) U.S. Cl.
CPC .......... *H04L 69/03* (2013.01); *H04L 63/083* (2013.01); *H04L 69/16* (2013.01)

(58) Field of Classification Search
CPC ... H04L 63/1433; H04L 63/083; H04L 69/03; H04L 69/16; G06F 2221/034; H04W 4/60; H04W 12/06; H04W 12/08; H04W 4/50; H04N 21/4122; H04N 21/41407; H04N 21/4183; H04N 5/50
See application file for complete search history.

(56) References Cited

U.S. PATENT DOCUMENTS

| | | | | |
|---|---|---|---|---|
| 5,793,966 A | * | 8/1998 | Amstein | G06F 17/3089 707/E17.116 |
| 5,935,212 A | * | 8/1999 | Kalajan | H04L 63/0428 709/203 |
| 6,345,307 B1 | * | 2/2002 | Booth | H03M 7/30 709/247 |

(Continued)

OTHER PUBLICATIONS

IBM, "Shared Memory Communications over RDMA (SMC-R) Linux Overview," IBM Corporation, Nov. 2014, pp. 1-29.
LaBrie et al., U.S. Appl. No. 14/994,101, filed Jan. 12, 2016.

*Primary Examiner* — Abiy Getachew
(74) *Attorney, Agent, or Firm* — Zilka-Kotab, P.C.

(57) ABSTRACT

A computer-implemented method, according to one embodiment, includes: sending a request to a target server to initiate a unidirectional connection, receiving a reply indicating whether the target server is capable of hosting the unidirectional connection or indicating identification of a unidirectional port, initiating a unidirectional connection to the identified unidirectional port of the target server in response to the reply providing the identification of the unidirectional port, sending a request to begin sending data to the target server over the unidirectional connection, receiving a response from the target server indicating that the target server is ready to receive data over the unidirectional connection, sending data to the target server over the unidirectional connection, sending a termination message over the unidirectional connection in response to sending the data to the target server, terminating the unidirectional connection, and performing a next communication with the target server over the TCP/IP connection.

20 Claims, 5 Drawing Sheets

(56) References Cited

U.S. PATENT DOCUMENTS

| | | | | |
|---|---|---|---|---|
| 6,412,009 | B1* | 6/2002 | Erickson | H04L 29/06 709/217 |
| 6,697,872 | B1* | 2/2004 | Moberg | H04L 29/06 370/351 |
| 7,216,172 | B2* | 5/2007 | Yang | H04L 67/02 709/203 |
| 7,287,080 | B2* | 10/2007 | Talanis | H04L 63/02 709/203 |
| 8,788,576 | B2 | 7/2014 | Chincisan | |
| 10,084,654 | B2 | 9/2018 | LaBrie et al. | |
| 2001/0013065 | A1* | 8/2001 | Patki | H04L 29/06 709/227 |
| 2014/0115093 | A1 | 4/2014 | Dirstine et al. | |
| 2014/0379778 | A1 | 12/2014 | Mahajan et al. | |
| 2017/0201422 | A1 | 7/2017 | LaBrie et al. | |

* cited by examiner

DATA TRANSFER POLICIES BETWEEN SOURCE AND TARGET SERVERS IN A WIDE AREA NETWORK

BACKGROUND

The present invention relates to data transfer over networks, and more specifically, this invention relates to data transfer policies for transferring data between different locations coupled to a Wide Area Network (WAN).

For a variety of reasons including disaster recovery, computer systems may be separated across geographic distances. Establishing and/or maintaining connectivity between these geographically separated systems may include the deployment of WAN technology.

Data storage systems, e.g., WANs, allow for data to be stored in multiple different storage sites and/or across multiple storage devices. Despite being stored in various locations, all, subsets, some, etc. of the data included in a data storage system may be accessed from a plurality of different locations, e.g., terminals. For example, computer systems may be located in different locations which are separated by varying distances. While this separation allows for disaster recovery should one of the computer systems fail, the distance between the computer systems has also introduced inefficiency when transferring data between storage locations. Moreover, these inefficiencies are exacerbated as the amount of data transferred between storage locations increases over time.

SUMMARY

A computer-implemented method, according to one embodiment, includes: sending, by a source server, over a TCP/IP connection, a request to a target server to initiate a unidirectional connection, receiving a reply from the target server over the TCP/IP connection, the reply indicating at least one of: whether the target server is capable of hosting the unidirectional connection and identification of a unidirectional port, in response to the reply indicating that the target server is not capable of hosting the unidirectional connection, transferring data over the TCP/IP connection to the target server, initiating a unidirectional connection to the identified unidirectional port of the target server in response to the reply providing the identification of the unidirectional port, sending, over the TCP/IP connection, a request to begin sending data to the target server over the unidirectional connection, receiving, over the TCP/IP connection, a response from the target server indicating that the target server is ready to receive data over the unidirectional connection, sending data to the target server over the unidirectional connection, sending a termination message over the unidirectional connection in response to sending the data to the target server, terminating the unidirectional connection, and performing a next communication with the target server over the TCP/IP connection.

A computer program product, according to another embodiment, includes a computer readable storage medium having program instructions embodied therewith, the program instructions executable by a computer to cause the computer to: send, by the computer, over a TCP/IP connection, a request to a target server to initiate a unidirectional connection, receive, by the computer, a reply from the target server over the TCP/IP connection, the reply indicating at least one of: whether the target server is capable of hosting the unidirectional connection and identification of a unidirectional port, in response to the reply indicating that the target server is not capable of hosting the unidirectional connection, transfer, by the computer, data over the TCP/IP connection to the target server, initiate, by the computer, a unidirectional connection to the identified unidirectional port of the target server in response to the reply providing the identification of the unidirectional port, send, by the computer, over the TCP/IP connection, a request to begin sending data to the target server over the unidirectional connection, receive, by the computer, over the TCP/IP connection, a response from the target server indicating that the target server is ready to receive data over the unidirectional connection, send, by the computer, data to the target server over the unidirectional connection, send, by the computer, a termination message over the unidirectional connection in response to sending the data to the target server, terminate, by the computer, the unidirectional connection, and perform, by the computer, a next communication with the target server over the TCP/IP connection.

A computer-implemented method, according to yet another embodiment, includes: receiving, by a target server, over a TCP/IP connection, a request from a source server to initiate a unidirectional connection, sending, from the target server, a reply to the source server over the TCP/IP connection, the reply indicating at least one of: whether the target server is capable of hosting the unidirectional connection and identification of a unidirectional port, in response to sending a reply indicating that the target server is not capable of hosting the unidirectional connection, receiving data over the TCP/IP connection from the source server, initiating a unidirectional connection using the identified unidirectional port in response to the reply providing the identification of the unidirectional port, receiving, over the TCP/IP connection, a request to begin sending data from the source server over the unidirectional connection, sending, over the TCP/IP connection, a response to the source server indicating that the target server is ready to receive data over the unidirectional connection, receiving data from the source server over the unidirectional connection, receiving a termination message over the unidirectional connection from the source server after receiving the data, sending, over the TCP/IP connection, acknowledgement of termination of the unidirectional connection to the source server, and performing a next communication with the source server over the TCP/IP connection.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for communication and data transfer between servers connected to a WAN. Some of the embodiments described herein may establish a data transfer request.

In one general embodiment, a computer-implemented method includes: sending, by a source server, over a TCP/IP connection, a request to a target server to initiate a unidirectional connection, receiving a reply from the target server over the TCP/IP connection, the reply indicating at least one of: whether the target server is capable of hosting the unidirectional connection and identification of a unidirectional port, in response to the reply indicating that the target server is not capable of hosting the unidirectional connection, transferring data over the TCP/IP connection to the target server, initiating a unidirectional connection to the identified unidirectional port of the target server in response to the reply providing the identification of the unidirectional port, sending, over the TCP/IP connection, a request to begin sending data to the target server over the unidirectional connection, receiving, over the TCP/IP connection, a response from the target server indicating that the target server is ready to receive data over the unidirectional connection, sending data to the target server over the unidirectional connection, sending a termination message over the unidirectional connection in response to sending the data to the target server, terminating the unidirectional connection, and performing a next communication with the target server over the TCP/IP connection.

In another general embodiment, a computer program product includes a computer readable storage medium having program instructions embodied therewith, the program instructions executable by a computer to cause the computer to: send, by the computer, over a TCP/IP connection, a request to a target server to initiate a unidirectional connection, receive, by the computer, a reply from the target server over the TCP/IP connection, the reply indicating at least one of: whether the target server is capable of hosting the unidirectional connection and identification of a unidirectional port, in response to the reply indicating that the target server is not capable of hosting the unidirectional connection, transfer, by the computer, data over the TCP/IP connection to the target server, initiate, by the computer, a unidirectional connection to the identified unidirectional port of the target server in response to the reply providing the identification of the unidirectional port, send, by the computer, over the TCP/IP connection, a request to begin sending data to the target server over the unidirectional connection, receive, by the computer, over the TCP/IP connection, a response from the target server indicating that the target server is ready to receive data over the unidirectional connection, send, by the computer, data to the target server over the unidirectional connection, send, by the computer, a termination message over the unidirectional connection in response to sending the data to the target server, terminate, by the computer, the unidirectional connection, and perform, by the computer, a next communication with the target server over the TCP/IP connection.

In yet another general embodiment, a computer-implemented method includes: receiving, by a target server, over a TCP/IP connection, a request from a source server to initiate a unidirectional connection, sending, from the target server, a reply to the source server over the TCP/IP connection, the reply indicating at least one of: whether the target server is capable of hosting the unidirectional connection and identification of a unidirectional port, in response to sending a reply indicating that the target server is not capable of hosting the unidirectional connection, receiving data over the TCP/IP connection from the source server, initiating a unidirectional connection using the identified unidirectional port in response to the reply providing the identification of the unidirectional port, receiving, over the TCP/IP connection, a request to begin sending data from the source server over the unidirectional connection, sending, over the TCP/IP connection, a response to the source server indicating that the target server is ready to receive data over the unidirectional connection, receiving data from the source server over the unidirectional connection, receiving a termination message over the unidirectional connection from the source server after receiving the data, sending, over the TCP/IP connection, acknowledgement of termination of the unidirectional connection to the source server, and performing a next communication with the source server over the TCP/IP connection.

Figure 1:
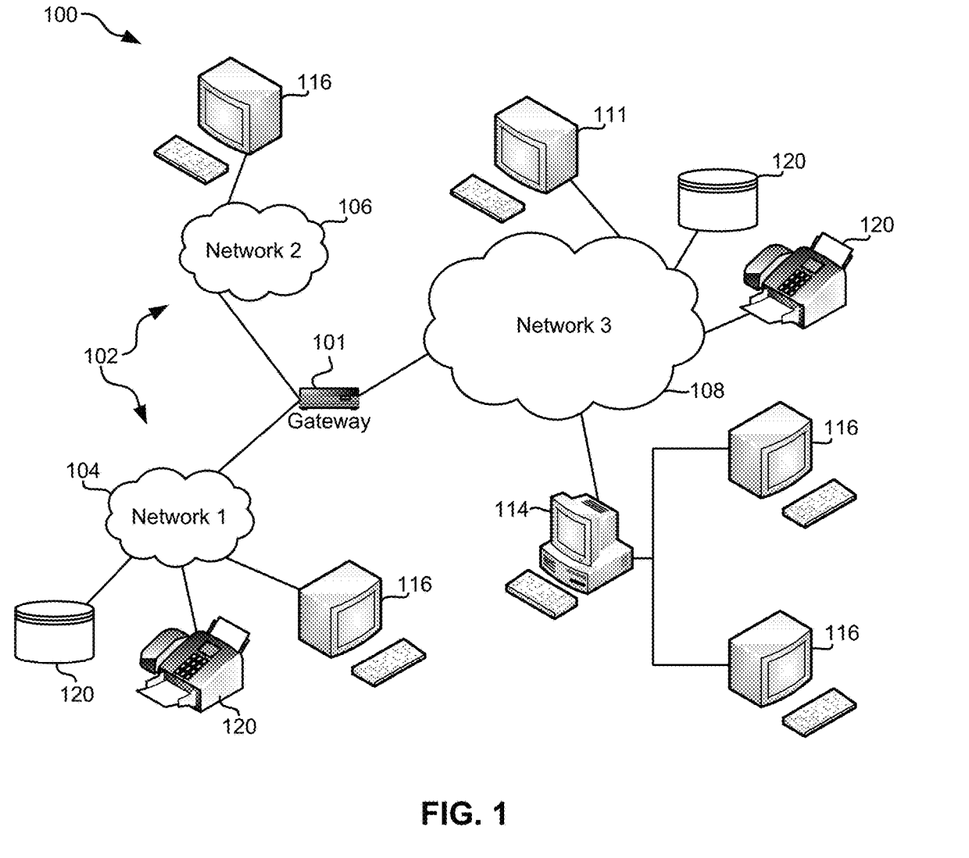
FIG. 1 illustrates a network architecture, in accordance with one embodiment.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
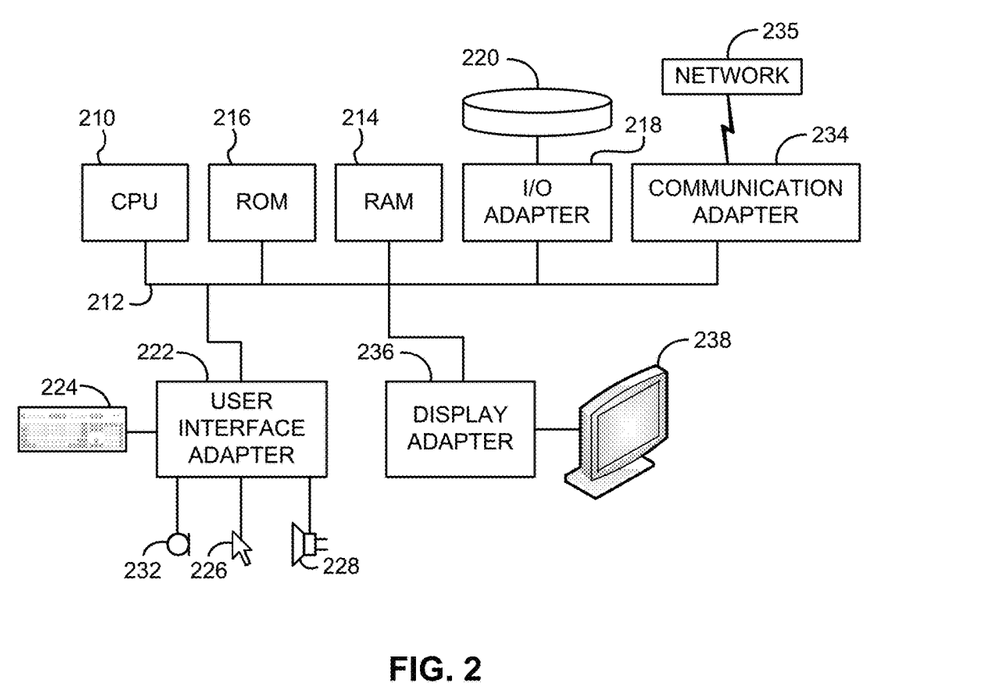
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Figure 3:
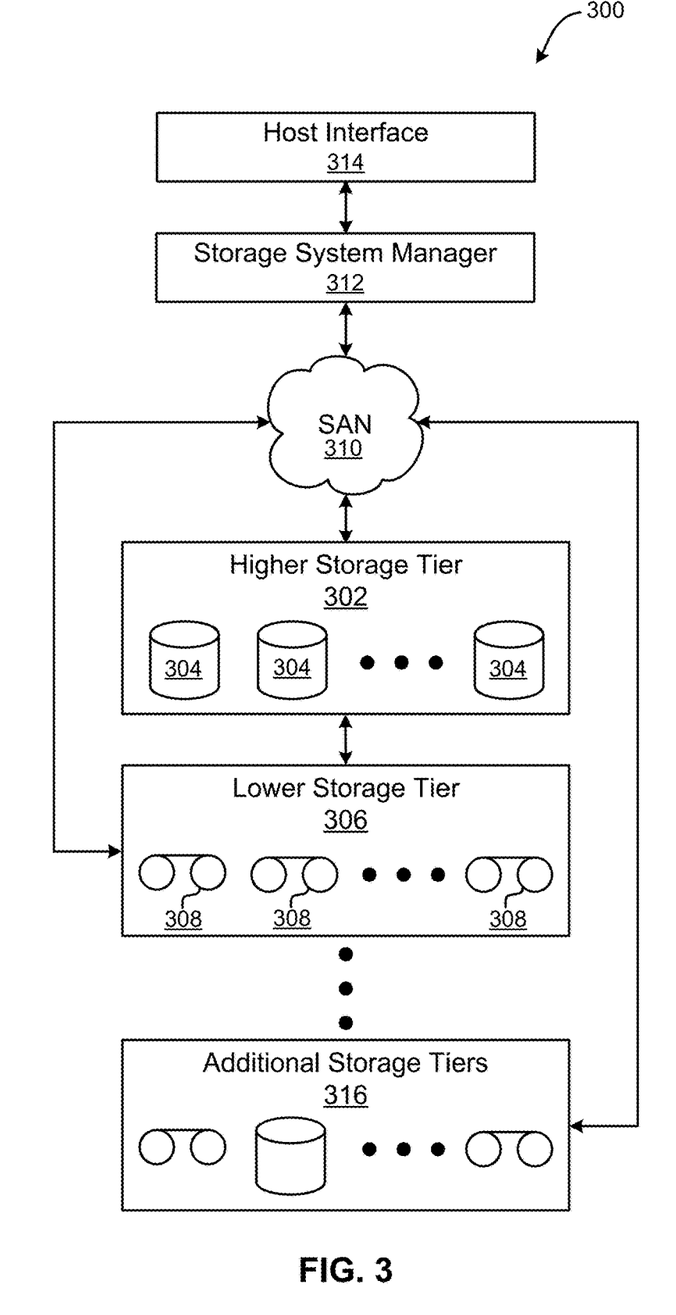
FIG. 3 illustrates a tiered data storage system in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

Computer systems of a network may be geographically separated from one another. Transferring data between these systems in a timely manner may be difficult because of the performance degradation that may be present in the network's connectivity. Performance may be limited when transferring data between systems of the network in response to the network's limited throughput sustainability, high packet loss and/or network latency. For example, when using a conventional storage manager to transmit and/or replicate data over a WAN from one system server to another, e.g., where the system servers are located at two separated locations, the performance characteristics available when using transmission control protocol/internet protocol (TCP/IP) over the WAN may prevent the data transfer from completing in a reasonable amount of time. In response to the TCP/IP anticipating packet loss and latency issues, these data transfer issues may be further complicated due to throttling of the workload transfer between the two servers.

User Datagram Protocol (UDP) is a network protocol that has been considered for meeting the rapid data transmission needs between servers described above. However, UDP may not be a desirable data transfer protocol due to UDP sacrificing, e.g., received data reliability, message send/receive acknowledgments, etc., in order to increase data transfer speeds. Multithreaded storage management program products were also considered in attempting to meet rapid data transmission needs between servers, but were deemed to be provide insufficient high speed data transfer. This is especially true for a WAN, due to the multithreaded storage management programs contributing to undesirable performance losses, e.g., bandwidth issues, network congestion, etc.

Dedicated networks and software development kits (SDKs) have also been considered, but similarly promote performance and/or data integrity issues, and thus are not appropriate solutions for meeting rapid data transmission needs between servers.

In contrast, embodiments described herein use server to server bi-directional communication capabilities to establish a high speed and reliable unidirectional connection for fast data transfer between servers, as will be described in further detail below.

In various embodiments described herein, the TCP/IP connections may be used to send data between a first server (hereinafter a "source server") and a second server (hereinafter a "target server") when the data, e.g., small queries and/or data packets, is determined to be a size that is less than or equal to a predefined threshold. However, it may be undesirable to send data between the source and target servers using the TCP/IP connections when the data is determined to be a size that is greater than a predefined threshold. The TCP/IP server to server connections may be undesirable for transmitting relatively larger data packets due to resulting latency issues during transmission, the slower transmission speeds of such connections, losses experienced during the transmission, etc. However, it should be noted that the size of the data to be transmitted relative to a threshold is in no way intended to limit the invention. Rather than determining whether a value is greater than or less than a threshold, equivalent determinations may be made, e.g., as to whether a value is within a predetermined range, having a value outside a predetermined range, having an absolute value above a threshold, etc., depending on the desired approach.

In addition to being used to transfer limited amounts of data between servers, the TCP/IP connections may be used to establish a unidirectional connection between the source server and the target server for sending data of a size that is greater than a predefined threshold. In other words, TCP/IP connections may be used to first connect a source and target server, and preferably facilitate the creation of a unidirectional connection at a desired point in time for a bulk data transfer, as will be described in further detail below.

It should be noted that the TCP/IP connection and the unidirectional connection may use the same network, e.g., may use a single internet connection. In other approaches, the unidirectional connection between the source server and the target server may be conducted over a different physical connection than the TCP/IP connection, e.g., an auxiliary line or fiber, a second internet connection, etc.

Figure 4A:
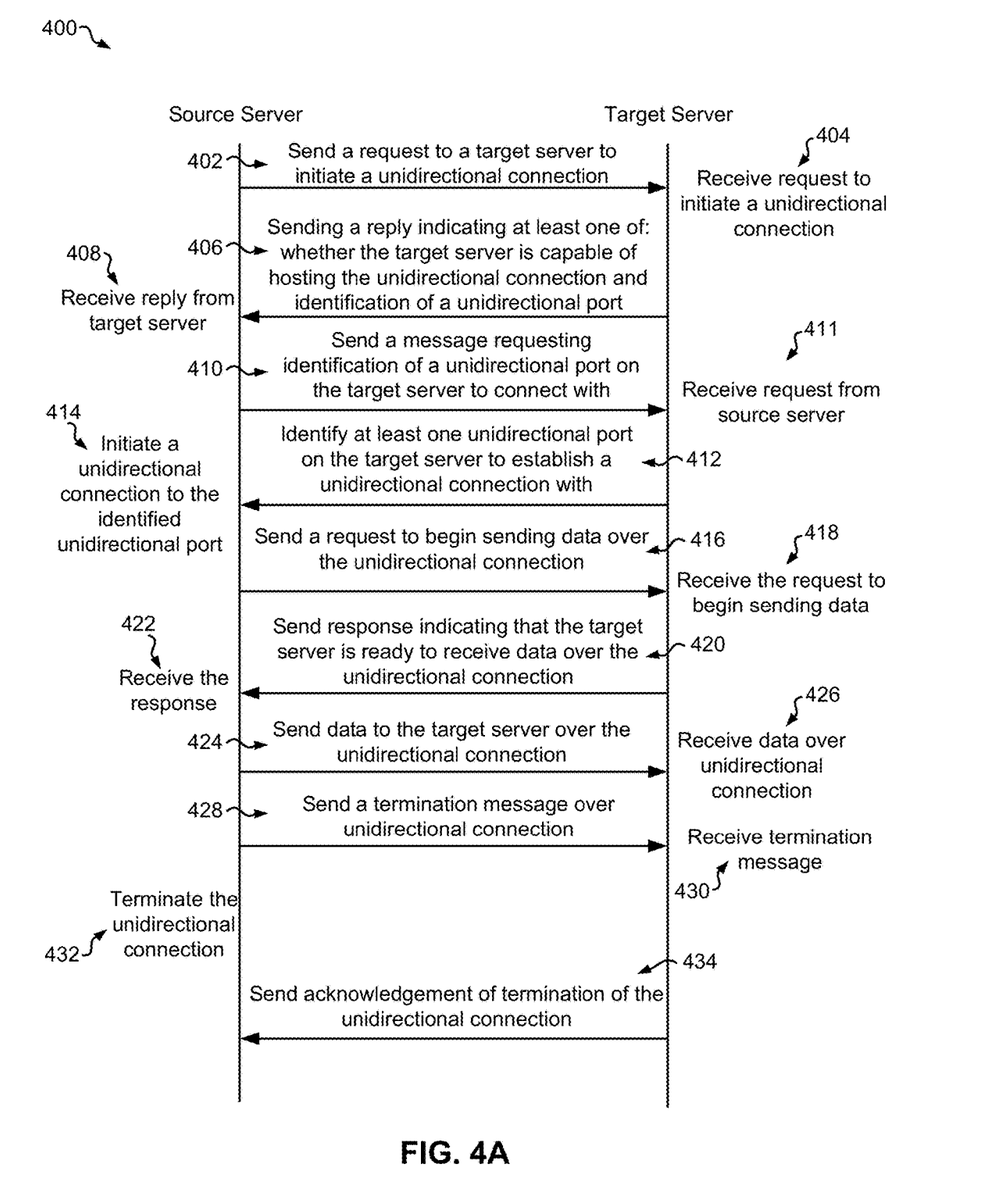
FIG. 4A illustrates a flowchart of a method for source server to target server data transfer, in accordance with one embodiment.

FIG. 4A illustrates how the TCP/IP connection may be used to establish a unidirectional connection and streaming session for sending the data from the source server to the target server in accordance with an exemplary embodiment. However, it should be noted that an authentication of the source server may be performed prior to the implementation of method 400.

In response to the source server having data to be sent to a target server, the target server may initiate an authentication of the source server. According to various embodiments, the authentication may occur over existing connections, e.g., existing first communication protocols, between the source server and the target server. For example, the authentication may occur over one or more existing address family internet (AF_INET) TCP/IP socket connections.

Because authentication may be performed over TCP/IP connections between servers, it is preferred that the authentication processes may be performed with a minimal performance footprint. As will be appreciated by one skilled in the art, TCP/IP connections may degrade as they are used over time. Thus, in an attempt to prevent unnecessary degradation of existing TCP/IP connections between servers of a network, the authentication process may desirably be performed with minimal performance impact. This, authentication may be performed regardless of whether the process is operating on a degraded network.

The authentication process may also include a transactional setup and/or exchange between the servers. For example, during the authentication process, the two servers may exchange, e.g., over the TCP/IP connection, small amounts of data to establish session connectivity, establish a base communication medium, allow the servers to sign on to TCP/IP connection between the two servers, etc.

Now referring to FIG. 4A, a flowchart of a method 400 is shown according to one embodiment. The method 400 may be performed in accordance with the present invention in any of the environments depicted in FIGS. 1-3, among others, in various embodiments. Of course, more or less operations than those specifically described in FIG. 4A may be included in method 400, as would be appreciated by one of skill in the art upon reading the present descriptions.

Each of the steps of the method 400 may be performed by any suitable component of the operating environment. For example, in various embodiments, the method 400 may be partially or entirely performed by a controller, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

Method 400 includes data transfer between the source server and the target server. The flowchart of the method 400 is illustrated from the perspectives of both the source server and the target server, where the source server is transmitting data to the target server.

Looking to FIG. 4A, operation 402 of method 400 includes the source server sending a request to a target server to initiate a unidirectional connection. The message requesting the unidirectional connection may be sent over an established TCP/IP connection, thus the target server may receive the request sent by the source server over the TCP/IP connection therebetween. According to some approaches, the request to establish a unidirectional connection may be sent in response to the source server being authenticated by the target server as mentioned above. Thus, the source server may send a request to the target server to initiate a unidirectional connection between the target server and the source server once the source server is authenticated. According to some approaches, the request sent from the source server to the target server may include a request to interrogate the target server, e.g., to determine whether the target is capable of hosting a unidirectional stream session.

As would be appreciated by one skilled in the art, a unidirectional connection may be faster in terms of data transfer rate, e.g., in comparison to a TCP/IP connection. According to various embodiments, any known unidirectional protocol may be used to establish the unidirectional connection. According to an illustrative embodiment, the unidirectional connection may be a fast and secure protocol (FASP) connection. To place the description in a context, and by way of example, only, the unidirectional connection may be described herein as a FASP connection. In other words, any descriptions and/or examples presented herein with reference to a FASP connection are in no way intended to limit the invention, but rather give context in terms of a unidirectional connection. Thus, according to some embodiments, the request sent from the source server to the target server to initiate a unidirectional connection may include a request for a unidirectional port, e.g., FASP port identification, as will soon become apparent.

Referring still to method 400, the target server receives the request from the source server to initiate a unidirectional connection in operation 404, and in response to receiving the request, the target server may send one or more replies to the source server, e.g., over the TCP/IP connection. See operation 406. Moreover, operation 408 includes the source server receiving the reply.

Depending on the embodiment, the one or more replies sent to the source server from the target server may vary, e.g., depending on capabilities of the target server. Specifically, the one or more replies from the target server may preferably indicate one or more of: whether the target server is capable of hosting the unidirectional connection, and identification of a unidirectional port. Although it is preferred that the one or more replies includes an identification of a unidirectional port, the reply may additionally or alternatively indicate whether the target server is capable of hosting the unidirectional connection at all, e.g. in response to an interrogation request from the source server. According to other approaches, the type of reply sent to the source server from the target server may vary, e.g., depending on the type of request received. As mentioned above, the request may include initiating a unidirectional connection, performing a FASP stream port identification, interrogating the target server, etc.

In some approaches, the reply sent from the target server to the source server in operation 406 may indicate that the target server is not capable of hosting the unidirectional connection. Thus, in response to receiving the reply, the data may be transferred from the source server to the target server over the TCP/IP connection. Accordingly, the target server may receive data over the TCP/IP connection from the source server in response to sending a reply indicating that the target server is not capable of hosting the unidirectional connection (not shown). This process may server as a failover, and ensure that the data is sent from the source server to the target server even when the unidirectional connection fails.

According to other embodiments, the data may be sent over the TCP/IP connection in response to the source server determining that the unidirectional connection cannot be established, e.g., upon experiencing a failed attempting to do so. In such embodiments, transferring the data over the TCP/IP connection may be performed to avoid data losses, e.g., due to a loss of signal between the servers during a data transfer. According to an example, data may be transferred from a source server to a target server over a TCP/IP connection in response to determining that the unidirectional connection cannot be established due to occasional interrupted signal transmissions on the unidirectional connection between the source server and the target server.

However, according to preferred embodiments, the reply sent from the target server to the source server in operation 406 may indicate that the target server is capable of hosting the unidirectional connection. Thus, in response to receiving the reply, the source server may send a message to the target server over the TCP/IP connection, the message requesting an identification of a unidirectional port on the target server to connect with. See operation 410. In some approaches, this indication may be made without identifying a unidirectional port on the target server to connect with.

In response to receiving the request to identify a unidirectional port as seen in operation 411, the target server preferably sends one or more replies identifying at least one unidirectional port on the target server, e.g., to establish a unidirectional connection with. See operation 412. For example, the target server may send a reply over the TCP/IP connection to the source server, indicating a selected one or more FASP stream port.

In response to receiving a reply from the target server over the TCP/IP connection identifying a unidirectional port on the target server (e.g., in either operation 406 or 412), the source server preferably initiates a unidirectional connection to the identified unidirectional port of the target server. See operation 414. In other words, the source server may initiate a unidirectional connection to an identified FASP stream port in response to receiving the reply from the target server. Approaches having one or more replies received from the target server may be used by the source server, (e.g., the source of the data to be transferred), to control whether the data is sent to the target server over the TCIP/IP connection or a unidirectional connection.

When the reply from the target server provides the identification of a unidirectional port, the source server may initiate a unidirectional connection, e.g., an outbound unidirectional connection, to the identified unidirectional port. As will become apparent upon reading the descriptions herein, the unidirectional port on the target server may serve as a port for receiving data sent by the source server once a unidirectional connection is established between the source server and the target server.

The source server may initiate the unidirectional connection to the identified unidirectional port by, e.g., modifying computer code to include the identified unidirectional port as the destination address of the unidirectional connection, transmitting a unidirectional connection invitation to the target server, initiating the unidirectional connection by a process that would be appreciated by one skilled in the art upon reading the present description, etc. The source server may also associate the outbound unidirectional connection to the TCP/IP connection, which may advantageously establish an affinity between the unidirectional connection and the TCP/IP connection.

Moreover, in approaches where the received request to initiate a unidirectional connection also includes a request for a unidirectional port, the target server may select one, or equivalently multiple ports for establishing the unidirectional connection. According to one approach, the target server may configure such selected ports to accept a connection from the source server. Alternatively, the target server may not configure such selected ports for accepting a connection from the source server and save the configuration of such selected ports for a later initiated connection action, e.g., which may be initiated in response to a detection made by a target server listening thread, as will be described in further detail below.

The target server may mark the one or more of the selected unidirectional ports as being "in use", e.g., to ensure that the selected unidirectional port(s) do not become occupied by other target server port use requests. It should be noted that components of the source server and/or the target server may be suspended and subsequently resumed and/or be marked "in use" throughout and/or between one or more of the operations and communication processes described herein. For example, the listening threads and ports of the source server and/or the target server, may be suspended and subsequently resumed and/or be marked "in use" between processes, e.g., to reserve such components and/or functionalities for specific scheduled data sending tasks. Such actions may prevent a data sending session from being prematurely terminated, e.g., which otherwise might occur by a server not recognizing that a suspended port and/or listening thread was being used by an active data sending process, e.g., as described in method 400.

Referring still to FIG. 4A, it should be noted that in some approaches, method 400 may skip operations 410 and 412. As mentioned above, operation 406 may actually include the target server indicating a unidirectional port on the target server, e.g., to establish a unidirectional connection with. Thus, operations 410 and 412 may be unnecessary in some approaches.

The target server may also launch a listening thread for a source server initiated unidirectional connection which executes asynchronously. For example, the target server may launch the listening thread in response to the target server sending the reply providing the identification of the unidirectional port to the source server. According to another example, the target server may launch the listening thread at any predetermined time and/or in response to any other operation described herein.

The listening thread may be configured to accept an incoming unidirectional connection, e.g., sent by the source server, on the identified unidirectional port to configure the unidirectional connection and/or accept data sent by the source server to the target sever over a configured unidirectional connection.

The target server listening thread may also create a unidirectional connection session for the identified unidirectional port and associate the session to the TCP/IP connection session, e.g., to establish an affinity between the unidirectional connection session and the TCP/IP session, for data error recovery purposes, to associate a failover communication platform in case the unidirectional connection fails, etc. Associating the unidirectional connection session for the identified unidirectional port and associate the session to the TCP/IP connection session may be especially important in embodiments where the source server sends the data in parallel across multiple unidirectional connections to multiple identified unidirectional connection ports on the target server, e.g., to prevent errors from occurring when reserializing the data.

Once the unidirectional connection is established, the target server listening thread may remain suspended until the unidirectional session is no longer in use. For example, the target server listening thread may be resumed once the data is successfully sent over the unidirectional connection, as will be described in greater detail elsewhere herein.

Referring again to the reply from the target server (see operations 406, 412), when the reply provides the identification of more than one unidirectional port, e.g., two unidirectional ports, three unidirectional ports, any number of unidirectional ports, etc., the source server initiating the unidirectional connection to the identified unidirectional port of the target server may include initiating multiple unidirectional connections with multiple identified unidirectional ports of the target server, where the data is split and sent across the multiple unidirectional connections. In such embodiments, the target server initiating the unidirectional connection using the identified unidirectional port of the target server may include initiating multiple unidirectional connections using multiple identified unidirectional ports of the target server, where the data is received across the multiple unidirectional connections.

Sending the data across multiple unidirectional connections between the source server and the target server may desirably decrease the transmission time of sending the data from the source server to the target server, e.g., due to each unidirectional connection sending only a portion of the total data.

Referring still to method 400, operation 416 further includes using the TCP/IP connection to send a request to begin sending data to the target server over the unidirectional connection. In other words, the source server may send, over the TCP/IP connection, a request to begin sending data to the target server over the unidirectional connection. The request to begin sending data to the target server over the new unidirectional connection may be sent by the source server to bring the target server's listening thread out of a suspended state and/or ensure that the unidirectional connection is still established. Although the unidirectional connection may at least be initiated (e.g., established), the target server may not be ready to receive data over the unidirectional connection. Thus, a request may be used to confirm the status of the target server.

In response to receiving the request to begin sending data from the source server over the unidirectional connection as seen in operation 418, the target server may evaluate whether it is ready to receive data from the source server over the unidirectional connection. When appropriate, the target server may generate and send a response to the source server over the TCP/IP connection, indicating that the target server is ready to receive data over the unidirectional connection. See operation 420. It should be noted that upon sending the response to the source server, the target server may be ready to receive data from the source server. For example, prior to the notifying the source server that the target server is ready to receive data over the FASP stream, the target server may block any data from being received over the FASP connection. Accordingly, upon notifying the source server that the target server is ready to receive data over the FASP stream, the target server may no longer block data from being received over the FASP connection. Thus, the target may not issue a blocking call to incoming source server connections subsequent to the sending of the response to receive data from the source server.

The target server may also send, over the TCP/IP connection, a security token to the source server, where the security token is sent with the request to begin sending data to the target server over the unidirectional connection to validate the source server. For example, the security token may include, e.g., a predefined binary bit sequence, a security token preset and recognized by the source server as well as the target server, a security token of a type known in the art, etc. The security token may ensure that the data transmission between the source server and the target server is secure, e.g., not mistakenly shared/addressed to other linked servers in the WAN.

According to further embodiments, the security token may be sent from the target server to the source server along with the identified unidirectional connection port (see operation 412 above).

The target server may set a flag in a TCP session associated with the TCP/IP connection that the next inbound data is to be received over the unidirectional connection in response to sending the response to the source server indicating that the target server is ready to receive data over the unidirectional connection. The flag set by the target server may ensure that the target is prepared to receive and/or listening for the data sending on the unidirectional connection and not the TCP/IP connection.

Furthermore, operation 422 includes the source server receiving the response from the target server indicating that the target server is ready to receive data over the unidirectional connection. In response to receiving the reply from the target server indicating that the target server is ready to receive data over the unidirectional connection, the source server may mark/queue data for sending over the unidirectional connection. According to some approaches, the source server may also receive (over the TCP/IP connection) the security token from the target server. The security token may be received with the request to begin sending data to the target server over the unidirectional connection to validate the source server.

The source server may set a flag in a TCP session associated with the TCP/IP connection that the next outbound data send request is to be sent over the unidirectional connection in response to receiving the response from the target server indicating that the target server is ready to receive data over the unidirectional connection. The flag may suspend the TCP session, for future bi-lateral communication between the source server and target server, e.g. after a termination of the unidirectional connection.

In response to the target server indicating that the target server is ready to receive data over the unidirectional connection, the target server may send data to the target server over the unidirectional connection. Accordingly, operation 424 includes sending data from the source server to the target server over the unidirectional connection, while operation 426 includes the target server receiving data from the source server over the unidirectional connection, as shown.

According to various embodiments, the target server may send the data to the target server over the unidirectional connection as a continuous data stream until all the data has been transferred to the target server. In other embodiments, the target server may send the data to the target server over the unidirectional connection in one or more data packets until all the data has been transferred to the target server. Accordingly, the source server may continue to send the data until all of the data has been sent to the target server.

As previously described, sending the data to the target server over the unidirectional connection may provide a highly productive transfer of data from the source server to the target server due to the high speed sending capabilities of the unidirectional connection, and maintained integrity of the sent data.

In response to receiving data from the source server over the unidirectional connection, the target server may then, e.g., store the received data, reconfigure the data in response to the data being received in more than one data packet, reserialize the data received at more than one identified unidirectional port in response to the data being split and sent in parallel across multiple unidirectional connections by the source server, etc.

According to some embodiments, the source server may probe network performance during the sending the data to the target server over the unidirectional connection. The probing may be used to determine if using the unidirectional connection to send data to the target server is more preferable, e.g. faster, more reliable, more efficient, etc., than sending the data over the TCP/IP connection. As network characteristics change over time, with use, etc., the TCP/IP connection and/or other types of connection between the source and target servers may be more preferable, e.g., in terms of the efficiency resulting from their implementation.

The source server may apply a preset policy in response to the probing indicating that a network performance characteristic meets a given one or more criterion, which may be predetermined, calculated in real time, set by a user, etc. Applying a policy may preferably include the source server switching the connection that the data is sent from the source server to the target server over, e.g., in response to the probing indicating that the currently used connection not performing in accordance with the performance criterion. According to one approach, applying the policy may include changing the data transfer to the TCP/IP connection, e.g., from the unidirectional connection, in response to the probing indicating that sending data over the unidirectional connection is less efficient than sending the data over the TCP/IP connection would provide. However, according to further approaches, the source server may switch the connection that the data is sent from the source server to the target server over for any desired reason.

The target server may also probe network performance during the receiving the data from the source server over the unidirectional connection and apply a preset policy in response to the probing indicating that a network performance characteristic meets a given one or more criterion.

At some point, a termination message may be created (e.g., built) and sent over the unidirectional connection, e.g., in response to successfully sending all of the data to the target server. See operation 428. Moreover, operation 430 includes receiving the termination message at the target server. According to one illustrative embodiment, the termination message may include a "stop using FASP" message to indicate that the FASP session is no longer needed, e.g., no longer needed for current data sending but alternatively may be suspended and used for subsequent data sending. According to further embodiments, the termination request may be generated and scheduled for sending by the source server at a desired time.

According to another approach, the termination message may be generated and sent by the source server to the target server with data over the unidirectional connection in response to determining that data sending is close to being complete. In such an approach, the termination message may include a notification of a characteristic that the last portion of data being sent over the unidirectional connection includes. Accordingly, upon receiving the data with the identified characteristic, the target server may determine that it has received all of the data sent by the source server over the unidirectional connection.

In one approach, the termination message may be sent after all data has been transferred between the source and target servers. According to other approaches, the termination message may be sent after an amount of time has passed, after a predetermined amount of processing power has been expended, after an amount of data has been transferred, etc.

Once a termination message has been received at the target server, preparations may be made at the source and/or target servers with regard to future operations. For example, the source server may mark future data transfers to be sent over the TCP/IP connection.

Referring still to FIG. 4A, operation 432 includes terminating the unidirectional connection. According to one approach, the source server may terminate the unidirectional connection, e.g., at least after sending the termination message to the target server. Additionally or alternatively, the target server may terminate the unidirectional connection.

According to one approach, the source server may unset the flag set in the TCP session, e.g., due to the unidirectional session being no longer in use after the termination message was sent to the target server, and wait for a response by the target server on the TCP/IP session. The source server may unset the flag in the TCP session in conjunction with sending the termination message.

The source server may terminate the unidirectional connection by unsetting the suspended source server flag that was previously suspended after the unidirectional connection was established. Unsetting the source server flag may indicate that the unidirectional connection session is no longer in use, and resume the bi-directional TCP/IP session between the source server and the target server.

The target server may receive the termination message over the unidirectional connection in response to receiving the data from the source server. In response to receiving the termination message, the target server may mark the unidirectional stream as unavailable and/or terminate the unidirectional connection. For example, after receiving the termination message, the target server may mark the FASP stream as "unavailable" and terminate the FASP stream.

The target server may terminate the unidirectional connection, e.g. in response to receiving the termination message from the source server. For example, the target server may unset the flag set in the associated TCP session, e.g., to reflect that the target server will no longer be using the unidirectional session, in response to receiving the termination message from the source server. The target server may also signal the suspended target server listening thread, e.g., to resume the suspended listening thread. In response to the target server unsetting the flag set in the associated TCP/IP session, and signaling the suspended listening thread, the listening thread may be returned to a resumed state. With the listening thread resumed and TCP/IP connection resumed, the unidirectional session may be terminated, and the target server identified unidirectional port may be returned to the "available" state, e.g., relinquishing use of the port.

The target server may send over the TCP/IP connection, acknowledgement of termination of the unidirectional connection to the source server. For example, referring again to method 400, operation 434 includes the target server sending acknowledgement to the source server over TCP/IP connection, indicating that the unidirectional connection to the source server has been terminated. In other words, a FASP connection between the source and target servers is no longer available.

According various embodiments, the termination acknowledgement may include a reference code that may be used to subsequently re-establish the unidirectional connection. According to one approach the reference code may re-establish the unidirectional connection in response to the source server having data to be sent to the target server, and the previously used unidirectional connection port and/or a similar unidirectional connection port being available.

Although the source server has been described elsewhere herein to terminate the unidirectional connection in conjunction with the source server sending the termination message to the target server, according to other embodiments, the source server may terminate the unidirectional connection and/or session in response to receiving the termination confirmation message from the target server. For example, operation 430 of method 400 above includes the source server terminating the FASP stream in response to receiving the termination message acknowledgment from the target server.

In response to each server determining that the unidirectional connection has been terminated, the source server and the target server may perform a next communication with the each other over the TCP/IP connection.

Because the unidirectional connection between the source server and target server has been terminated, next (subsequent) communications between the two servers may be performed over the TCP/IP connection therebetween. For example, the TCP/IP connection between the source server and target server may be used to establish another unidirectional connection, e.g., by performing method 400 again. According to some approaches, a termination message may be issued which includes a notification that the next communication and/or data will be sent from the source server to the target server over the TCP/IP connection and/or a request to termination of the FASP stream.

Figure 4B:
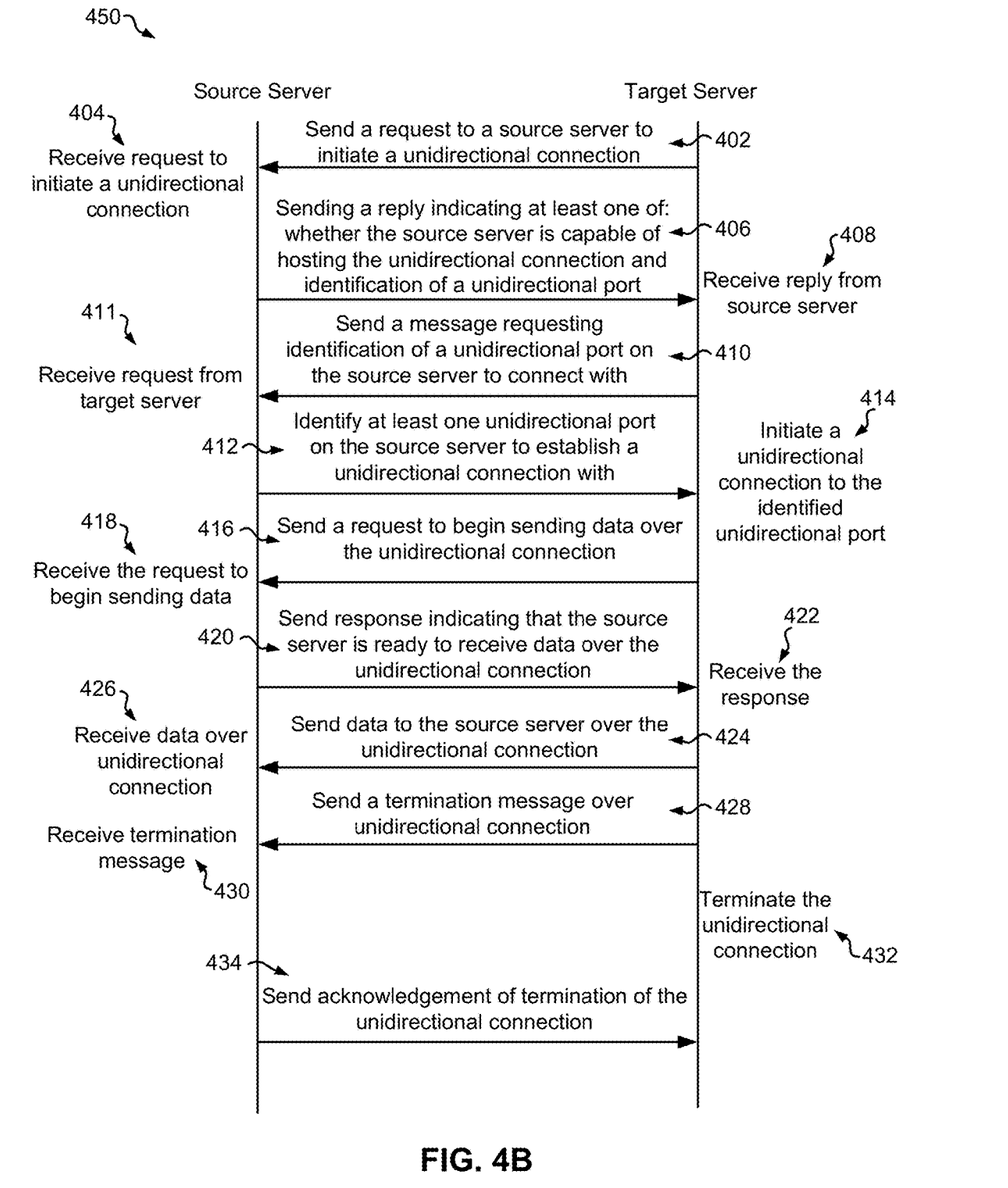
FIG. 4B illustrates the flowchart of the method of FIG. 4A with switched server roles, in accordance with one embodiment.

FIG. 4B illustrates data transfer in the reverse direction, where the target server sends data to the source server over a unidirectional connection.

Referring to FIG. 4B, a flowchart of a method 450 is shown according to one embodiment. The method 450 may be performed in accordance with the present invention in any of the environments depicted in FIGS. 1-4A, among others, in various embodiments. Of course, more or less operations than those specifically described in FIG. 4B may be included in method 450, as would be appreciated by one of skill in the art upon reading the present descriptions.

Each of the steps of the method 450 may be performed by any suitable component of the operating environment. For example, in various embodiments, the method 450 may be partially or entirely performed by a controller, or some other device having one or more processors therein. The processor, e.g., processing circuit(s), chip(s), and/or module(s) implemented in hardware and/or software, and preferably having at least one hardware component may be utilized in any device to perform one or more steps of the method 450. Illustrative processors include, but are not limited to, a central processing unit (CPU), an application specific integrated circuit (ASIC), a field programmable gate array (FPGA), etc., combinations thereof, or any other suitable computing device known in the art.

The operations of FIG. 4B mirror the operations of method 400 of FIG. 4A, but with switched server roles. Each of the operations performed by the source server in method 400 of FIG. 4A are shown performed by the target server in method 450 of FIG. 4B, and each of the operations performed by the target server in method 400 of FIG. 4A are shown performed by the source server in method 450 of FIG. 4B. Accordingly, the operations of FIG. 4B have common numbering with those of FIG. 4A. Accordingly, the target server of the WAN may send data to the source server of the WAN for the advantageous purposes described elsewhere herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
   sending, by a source server, over a TCP/IP connection, a request to a target server to initiate a unidirectional connection;
   receiving a reply from the target server over the TCP/IP connection, the reply indicating at least one of: whether the target server is capable of hosting the unidirectional connection and identification of a unidirectional port;
   in response to the reply indicating that the target server is not capable of hosting the unidirectional connection, transferring data over the TCP/IP connection to the target server;
   initiating a unidirectional connection to the identified unidirectional port of the target server in response to the reply providing the identification of the unidirectional port;
   sending, over the TCP/IP connection, a request to begin sending data to the target server over the unidirectional connection;
   receiving, over the TCP/IP connection, a response from the target server indicating that the target server is ready to receive data over the unidirectional connection;
   sending data to the target server over the unidirectional connection;
   sending a termination message over the unidirectional connection in response to sending the data to the target server;
   terminating the unidirectional connection; and
   performing a next communication with the target server over the TCP/IP connection.

2. The computer-implemented method of claim 1, wherein the unidirectional connection is a fast and secure protocol (FASP) connection.

3. The computer-implemented method of claim 1, comprising probing network performance during the sending the data to the target server over the unidirectional connection, applying a preset policy in response to the probing indicating that a network performance characteristic meets a predetermined criterion, wherein applying the policy includes changing the data transfer to the TCP/IP connection.

4. The computer-implemented method of claim 1, comprising setting a flag in a TCP session associated with the TCP/IP connection that a next outbound data send request is to be sent over the unidirectional connection in response to receiving the response from the target server indicating that the target server is ready to receive data over the unidirectional connection, and unsetting the flag in the TCP session in conjunction with sending the termination message.

5. The computer-implemented method of claim 1, wherein a security token is received from the target server, wherein the security token is sent with the request to begin sending data to the target server over the unidirectional connection to validate the source server.

6. The computer-implemented method of claim 1, wherein initiating the unidirectional connection to the identified unidirectional port of the target server includes initiating multiple unidirectional connections with multiple identified unidirectional ports of the target server, wherein the data is split and sent across the multiple unidirectional connections.

7. The computer-implemented method of claim 1, wherein the data is sent over the TCP/IP connection in response to determining that the unidirectional connection cannot be established upon attempting to establish the unidirectional connection.

8. A computer program product, the computer program product comprising a non-transitory computer readable storage medium having program instructions embodied therewith, the program instructions executable by a computer to cause the computer to:
   send, by the computer, over a TCP/IP connection, a request to a target server to initiate a unidirectional connection;
   receive, by the computer, a reply from the target server over the TCP/IP connection, the reply indicating at least one of: whether the target server is capable of hosting the unidirectional connection and identification of a unidirectional port;
   in response to the reply indicating that the target server is not capable of hosting the unidirectional connection, transfer, by the computer, data over the TCP/IP connection to the target server;
   initiate, by the computer, a unidirectional connection to the identified unidirectional port of the target server in response to the reply providing the identification of the unidirectional port;
   send, by the computer, over the TCP/IP connection, a request to begin sending data to the target server over the unidirectional connection;

receive, by the computer, over the TCP/IP connection, a response from the target server indicating that the target server is ready to receive data over the unidirectional connection;

send, by the computer, data to the target server over the unidirectional connection;

send, by the computer, a termination message over the unidirectional connection in response to sending the data to the target server;

terminate, by the computer, the unidirectional connection; and perform, by the computer, a next communication with the target server over the TCP/IP connection.

9. The computer program product of claim 8, wherein the unidirectional connection is a fast and secure protocol (FASP) connection.

10. The computer program product of claim 8, comprising program instructions executable by a computer to cause the computer to probe network performance during the sending the data to the target server over the unidirectional connection, and apply a preset policy in response to the probing indicating that a network performance characteristic meets a predetermined criterion, wherein applying the policy includes changing the sending of the data to the TCP/IP connection.

11. The computer program product of claim 8, comprising program instructions executable by the computer to cause the computer to set a flag in a TCP session associated with the TCP/IP connection that a next outbound data send request is to be sent over the unidirectional connection in response to receiving the response from the target server indicating that the target server is ready to receive data over the unidirectional connection, and unset the flag in the TCP session in conjunction with sending the termination message.

12. The computer program product of claim 8, wherein a security token is received from the target server, wherein the security token is sent with the request to begin sending data to the target server over the unidirectional connection to validate a source server.

13. The computer program product of claim 8, wherein initiating the unidirectional connection to the identified unidirectional port of the target server includes initiating multiple unidirectional connections with multiple identified unidirectional ports of the target server, wherein the data is split and sent across the multiple unidirectional connections.

14. The computer program product of claim 8, wherein the data is sent over the TCP/IP connection in response to determining that the unidirectional connection cannot be established upon attempting to establish the unidirectional connection.

15. A computer-implemented method, comprising:

receiving, by a target server, over a TCP/IP connection, a request from a source server to initiate a unidirectional connection;

sending, from the target server, a reply to the source server over the TCP/IP connection, the reply indicating at least one of: whether the target server is capable of hosting the unidirectional connection and identification of a unidirectional port;

in response to sending a reply indicating that the target server is not capable of hosting the unidirectional connection, receiving data over the TCP/IP connection from the source server;

initiating a unidirectional connection using the identified unidirectional port in response to the reply providing the identification of the unidirectional port;

receiving, over the TCP/IP connection, a request to begin sending data from the source server over the unidirectional connection;

sending, over the TCP/IP connection, a response to the source server indicating that the target server is ready to receive data over the unidirectional connection;

receiving data from the source server over the unidirectional connection;

receiving a termination message over the unidirectional connection from the source server after receiving the data;

sending, over the TCP/IP connection, acknowledgement of termination of the unidirectional connection to the source server; and performing a next communication with the source server over the TCP/IP connection.

16. The computer-implemented method of claim 15, wherein the unidirectional connection is a fast and secure protocol (FASP) connection.

17. The computer-implemented method of claim 15, comprising probing network performance during the receiving the data from the source server over the unidirectional connection, applying a preset policy in response to the probing indicating that a network performance characteristic meets a predetermined criterion, wherein applying the policy includes changing the sending of the data to the TCP/IP connection.

18. The computer-implemented method of claim 15, comprising setting a flag in a TCP session associated with the TCP/IP connection that a next inbound data is to be received over the unidirectional connection in response to sending the response to the source server indicating that the target server is ready to receive data over the unidirectional connection, and unsetting the flag in the TCP session in response to receiving the termination message.

19. The computer-implemented method of claim 15, comprising sending a security token to the source server, wherein the security token is sent with the request to begin sending data to the target server over the unidirectional connection to validate the source server.

20. The computer-implemented method of claim 15, wherein initiating the unidirectional connection using the identified unidirectional port of the target server includes initiating multiple unidirectional connections using multiple identified unidirectional ports of the target server, wherein the data is received across the multiple unidirectional connections.

* * * * *